(12) United States Patent
Hunacek et al.

(10) Patent No.: US 11,451,846 B2
(45) Date of Patent: Sep. 20, 2022

(54) PRE-ENTITLEMENT ENFORCEMENT

(71) Applicant: NAGRAVISION S.A., Cheseaux-sur-Lausanne (CH)

(72) Inventors: Didier Hunacek, Cheseaux-sur-Lausanne (CH); Jean-Bernard Fischer, Cheseaux-sur-Lausanne (CH)

(73) Assignee: NAGRAVISION S.A., Cheseaux-sur-Lausanne (CH)

(*) Notice: Subject to any disclaimer, the term of this patent is extended or adjusted under 35 U.S.C. 154(b) by 0 days.

(21) Appl. No.: 17/358,789

(22) Filed: Jun. 25, 2021

(65) Prior Publication Data

US 2021/0329326 A1 Oct. 21, 2021

Related U.S. Application Data

(63) Continuation of application No. 16/609,837, filed as application No. PCT/EP2018/061332 on May 3, 2018, now Pat. No. 11,076,186.

(30) Foreign Application Priority Data

May 5, 2017 (EP) .................................... 17169830

(51) Int. Cl.
*H04N 21/266* (2011.01)
*H04N 21/235* (2011.01)
(Continued)

(52) U.S. Cl.
CPC ..... *H04N 21/26606* (2013.01); *H04N 21/235* (2013.01); *H04N 21/4181* (2013.01); *H04N 21/4623* (2013.01); *H04N 21/63345* (2013.01)

(58) Field of Classification Search
CPC .......... H04N 21/26606; H04N 21/235; H04N 21/4181; H04N 21/4623; H04N 21/63345
(Continued)

(56) References Cited

U.S. PATENT DOCUMENTS 6,424,717 B1 7/2002 Pinder et al.
10,602,094 B1* 3/2020 Longo .................... H04L 9/088
(Continued)

FOREIGN PATENT DOCUMENTS

EP 1 094 667 A1 4/2001

OTHER PUBLICATIONS

International Search Report dated May 22, 2018 in PCT/EP2018/061332 filed on May 3, 2018.
(Continued)

*Primary Examiner* — Dominic D Saltarelli
(74) *Attorney, Agent, or Firm* — Oblon, McClelland, Maier & Neustadt, L.L.P.

(57) ABSTRACT

A method of transmitting entitlement messages to content consumption devices in a access control system, the method comprising periodically transmitting entitlement messages to content consumption devices in a access control system and periodically extending an expiry time comprised in the entitlement messages. The entitlement messages comprise indicator data indicating to the content consumption devices that subsequent entitlement messages loaded into a content consumption device after a first entitlement message is loaded into the content consumption device shall not be used by the content consumption device to access protected media content.

15 Claims, 10 Drawing Sheets

(51) Int. Cl.
    *H04N 21/418*     (2011.01)
    *H04N 21/462*     (2011.01)
    *H04N 21/633*     (2011.01)
    *H04N 21/4623*     (2011.01)
    *H04N 21/6334*     (2011.01)

(58) Field of Classification Search
    USPC .......................................................... 725/31
    See application file for complete search history.

(56) References Cited

U.S. PATENT DOCUMENTS

| | | | |
|---|---|---|---|
| 2002/0120928 A1 | 8/2002 | Wajs | |
| 2003/0221100 A1* | 11/2003 | Russ | H04N 21/4405 713/153 |
| 2005/0025312 A1 | 2/2005 | Rijkaert et al. | |
| 2010/0235624 A1 | 9/2010 | Candelore | |
| 2011/0219396 A1* | 9/2011 | Kudelski | H04N 7/1675 725/31 |
| 2011/0283307 A1 | 11/2011 | Ooi | |
| 2012/0008773 A1 | 1/2012 | Westerveld | |
| 2016/0036783 A1* | 2/2016 | Penugonda | H04L 63/062 713/168 |
| 2016/0088336 A1 | 3/2016 | Wajs | |
| 2016/0316247 A1* | 10/2016 | Biagini | H04N 21/25816 |
| 2017/0251276 A1* | 8/2017 | David | H04N 21/234 |
| 2017/0374397 A1* | 12/2017 | Rylskiy | H04N 21/43 |

OTHER PUBLICATIONS

European Search Report dated Jun. 1, 2017 in European Patent Application 17 16 9830 filed on May 5, 2017.

\* cited by examiner

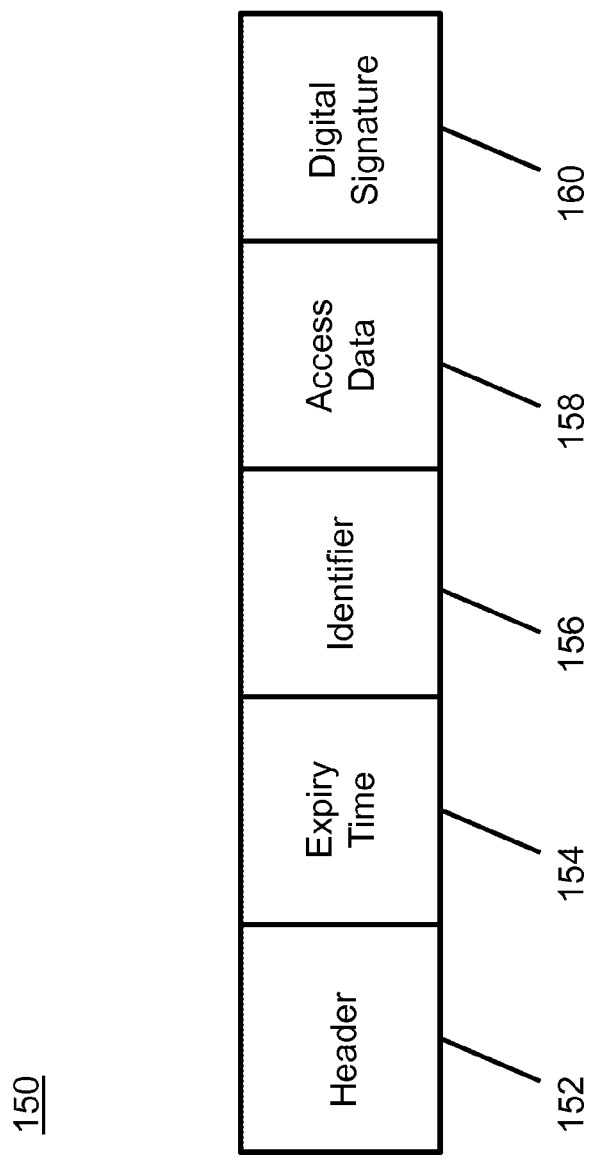

PRE-ENTITLEMENT ENFORCEMENT

CROSS-REFERENCE TO RELATED APPLICATIONS

This application claims the benefit of priority to U.S. application Ser. No. 16/609,837, filed Oct. 31, 2019, which the national stage entry of PCT/EP2018/061332, filed May 3, 2018, which claims priority to European Application No. 17169830.1, filed May 5, 2017. The entire contents of the prior applications are hereby incorporated by reference.

FIELD

The present disclosure relates to granting access to broadcast media content, in particular although not exclusively, using entitlements installed in a content consumption device upon first activation of the content consumption device.

BACKGROUND

Conditional Access Systems CASs enable broadcast service providers, in particular digital broadcast service providers, to restrict content, for example subscription channels, services or broadcast events or programs, to subscribers of a service offering. The content is broadcast in scrambled form together with an encrypted Control Word CW that enable a receiver, for example a set-top box STB, to descramble the content and enable it to be viewed. The CW is typically distributed in the content stream in an Entitlement Control Message ECM containing the encrypted CW, the date and/or time and an indication of the entitlement, for example subscription level, required to view the content. A CAS also typically transmits an Entitlement Management Message EMM that comprises a decryption key for decrypting the CW and set up the entitlement conditions (e.g. corresponding subscription level/package, expiry date, etc.) in the STB that govern the access to the content. Alternatively, an EMM comprises the rights and the decryption key is stored in the STB separately, for example at manufacturing time or by way of a smart card or firmware update. The CW is changed by the CAS at short intervals, for example every two seconds, so that failure to correctly decrypt the CW when the required entitlement is not present or has expired leads to failure of the descrambling. In this way, the content is accessible substantially only when the required entitlement is valid in the STB. A CAS typically uses a smart card that can be inserted into the STB and comprises subscriber details that can provide access to the CW in clear form and hence enable descrambling. More recently, some STBs implement a CAS without the need for a smart card, with content consumption entitlement being handled in a software environment that may be remotely configurable. Many different CAS implementations exist, using different standards depending on geographical location, for example the DVB standard, which is mainly applicable in Europe.

When a user buys a new smartcard, the smart card often comes with a routine for setting up one or more default entitlements once installed. The entitlements provide access to a certain service offering, for example access to all channels provided by the service provider for a limited duration from the time the smart card is first installed. This enables a new customer to sample the offering and provide access during a set-up period of the account. To this end, the smart card is configured to set up an entitlement on activation, with an expiry date a pre-defined period after the date of activation. As this mechanism remains latent in the smart card, it represents a security vulnerability in terms of a route of attack by which the attacker re-runs the pre-entitlement set up periodically to renew the expiry date of the pre-entitlement. While this risk may be acceptable in the context of a smart card, which can be provided with strong security, it is even more pertinent in the context of a CAS relying on STBs without a smartcard. Such devices would rely on running the pre-entitlement setup routine in software and would therefore be even more vulnerable to this type of attack.

BRIEF DESCRIPTION OF THE DRAWINGS

FIG. 1B shows schematic representation of a pre-entitlement message

DETAILED DESCRIPTION OF THE DRAWINGS

Figure 1A:
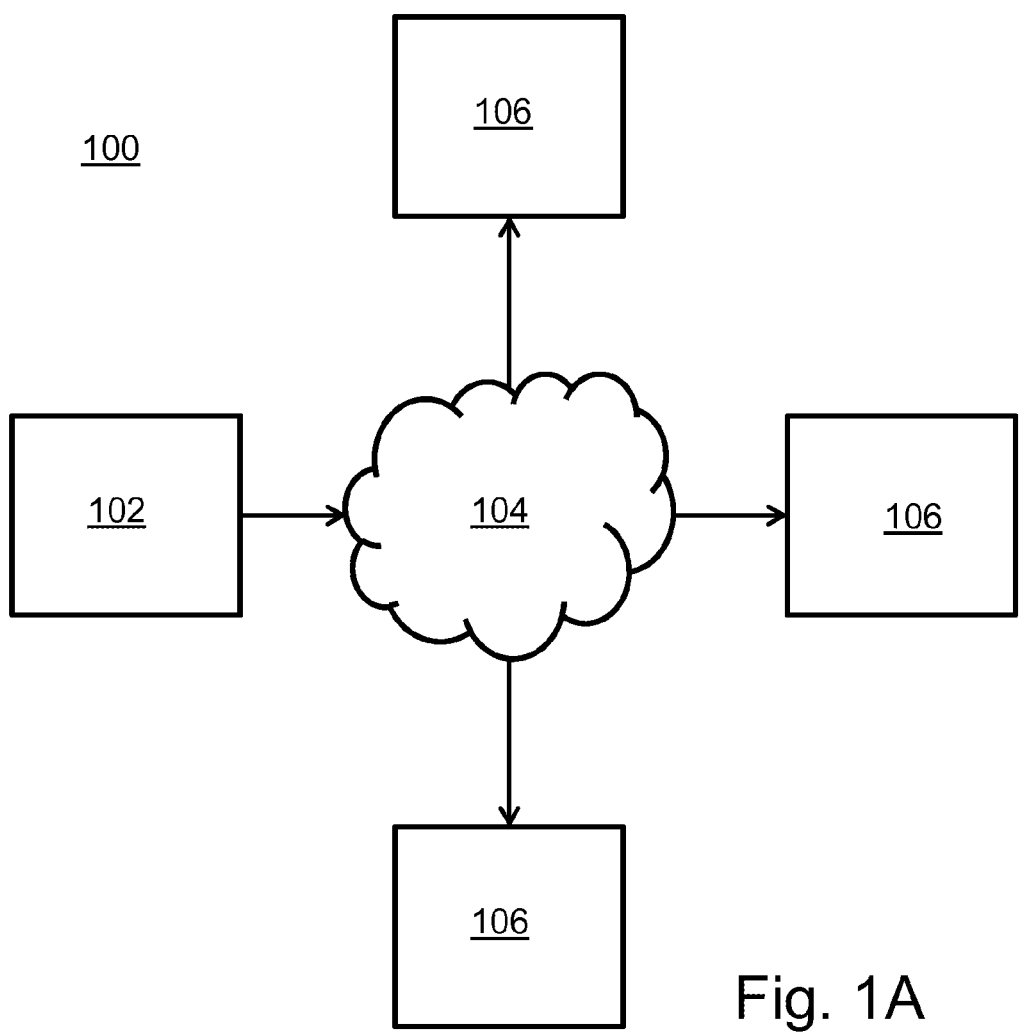
FIG. 1A shows a schematic representation of a conditional access system.

In overview, methods of transmitting an entitlement message and an access control module ACM are disclosed, which enable an access control system ACS to provide a pre-entitlement functionality along the lines described above. The methods enable a new content consumption device incorporating the ACM (or a new ACM) to provide a user with a default entitlement to access content on first use for a limited period of time, with improved security, based on entitlement messages that are transmitted with a fixed expiry times each, and updating the expiry time, for example periodically, to provide a defined validity period relative to the transmission date for each transmitted message. It will be understood that the terms ACS and ACM are used herein to refer to systems and modules controlling access to media content. Where certain terms are used in this disclosure that may have an established meaning in the field of media content access control, such as Conditional Access System CAS or Conditional Access Module CAM, it will be understood that these terms are used as examples to the extent that they have an established meaning understood by the person skilled in the art. In some embodiments, the ACM may be a CAM and/or the ACS may be CAS, as commonly understood in the art.

In a first aspect, a method of transmitting an entitlement message in an ACS is disclosed. The entitlement message comprises an expiry time and access data enabling access to protected media content until the expiry time, for example a key to decrypt encrypted CWs and/or other data enabling access, for example an indication of a subscription level or category that enable an ACM to determine whether access should be granted to a content item or not. The entitlement message also comprises indicator data indicating to a receiving content consumption device that use of subsequent entitlement messages received by the receiving ACM after a first entitlement message has been processed by the receiving ACM, for example loaded or installed, shall be prevented, to prevent unauthorised extension of the expiry time of the first entitlement message. Entitlement messages comprising such expiry time, access and indicator data will be referred to as pre-entitlement messages in what follows, for the sake of brevity and clarity of exposition. Likewise, data in pre-entitlement messages comprising such expiry time, access and indicator data will be referred to below as pre-entitlement data.

The method comprises periodically transmitting the pre-entitlement message, updating the expiry time of the pre-entitlement message to maintain a duration of validity for which access to the protected content is enabled and periodically transmitting the pre-entitlement message with the updated expiry time. The ACS may for example be a broadcast system that broadcasts protected content and the pre-entitlement messages may be broadcast, for example by way of cable, satellite or over the air using any suitable protocol, for example Quadrature Amplitude Modulation QAM, Coded Orthogonal Frequency Domain Multiplex COFDM, Quadrature Phase Shift Keying QPSK, Digital Video Broadcasting-Satellite-Second Generation DVB-S2, Asynchronous Serial Interface ASI, Internet Protocol Television IP-TV, etc. Pre-entitlement messages may be transmitted every few seconds, for example every ten seconds, for example in a data carousel or as part of a broadcast stream, for example on one or more broadcast channels of a service provider operating the ACS. The pre-entitlement message may be addressed to a plurality of ACMs, for example a group of ACMs, for example those associated with a particular service provider if the ACS serves multiple service providers, or recent ACMs or subscribers, as may be determined by ranges of ACM serial numbers or subscriber identifiers. Alternatively, the pre-entitlement messages may be addressed to any and all ACMs in the ACS or to a set of specified content consumption devices or ACMs. It will of course be appreciated that the pre-entitlement message may repeatedly be updated, with a new expiry time, and periodically transmitted between updates, to generate a moving window of validity for the pre-entitlement messages.

In some embodiments, the pre-entitlement message comprises an identifier specific to the expiry time of the message. This enables the pre-entitlement messages to be used more flexibly, as described below, and in particular enables the extension of an initial expiry time of a previously transmitted pre-entitlement message or other updates of the previously sent pre-entitlement message. In particular, this can be achieved by transmitting the updated entitlement message with an extended expiry time later than the initial expiry time of a previously transmitted entitlement message (or an updated entitlement for a different set of services, for example adding services) but having the identifier of the previously transmitted message, as will be further explained below. It will be understood that the identifier may be part of the indicator data, or the indicator data may of course consist of the identifier, for example with the presence of a non-zero identifier value in a defined data field providing the indication. Alternatively, the identifier may be a separate item of data. In any case, the identifier may be a serial number that is, for example, incremented each time the expiry time of the pre-entitlement message is updated, the (initial) expiry time itself or any other identifier specific to the (initial) expiry time itself and thus capable of distinguishing the pre-entitlement message with the (initial) expiry time from other pre-entitlement messages having a different (initial) expiry time.

In some embodiments, the identifier is specific to the message as a whole rather than to the expiry time, thus enabling re-loading of identical messages only. In either case, all pre-entitlement messages that are not yet expired may be re-transmitted periodically to enable refresh, restoration or modification, as the case may be, of the first loaded pre-entitlement message received at a receiver. In some embodiments, the pre-entitlement message or pre-entitlement data is digitally signed to enable authentication at the receiver and reduce the risk of unauthorised tampering with the pre-entitlement message or data in transit or at the receiver.

In a second aspect, an ACM is configured to receive a pre-entitlement message comprising pre-entitlement data and to prevent use of the pre-entitlement data by the ACM if the pre-entitlement data has been received by the ACM after previous pre-entitlement data has been processed, for example loaded, installed or used, by the ACM. The condition to prevent use or not may be evaluated in a number of ways, for example determining that a previous pre-entitlement message was processed in any way. In some embodiments this evaluation may be based on an identifier that is part of the pre-entitlement data, allowing for a loophole by the entity creating the pre-entitlement message/data to extend the expiry time as discussed below. There may in fact be no explicit evaluation of the first receipt requirement, for example the ACM may simply store the first pre-entitlement message it receives in a way so that later pre-entitlement messages cannot be stored in a way required by the ACM for use of a pre-entitlement message. The first-receipt requirement may be evaluated at the time of receipt of the message (for example preventing use by discarding the message) or at the time of use together with the expiry time evaluation.

Advantageously, by enforcing the rule that later pre-entitlement messages may not be used, an unauthorised extension of the pre-entitlement period at the ACM can be prevented—this rule is easier to enforce than preventing manipulation of the known process for creating a pre-entitlement, including setting an expiry time at the set-top box. For example, since the pre-entitlement message and/or data is fully created prior to transmission, for example at a head end, its integrity, including the integrity of the expiry time, can be verified by known authentication mechanisms based on verification of a digital signature of the message and/or data. This process is more readily secured as compared to the local creation of entitlements at the ACM and hence lends itself to reducing the likelihood of a successful attack on the generation and use of preview entitlements and to extend this mechanism to smartcard-less ACMs and STBs, which was previously not considered to be feasible with sufficient security.

It will be understood that other checks may naturally be carried out as well, for example if the expiry time has passed.

In some embodiments, the ACM is configured to authenticate the pre-entitlement message and/or data, that is to verify that the message and/or data has not been manipulated after it has been transmitted by its authorised source, for example the service provider or head end. The message and/or data may be digitally signed prior to transmission and authenticating the message and/or data may comprise verifying the digital signature, for example using a digital certificate trusted to be associated with the source of the message. Numerous methods for digital signature verification, including the use of trusted certificates, public keys of asymmetric key pairs, etc., are well known and will be readily incorporated by the skilled person with the disclosed methods and ACMs, as needed. In these embodiments, preventing use of the message and/or data may comprise preventing use if the authentication fails.

In some embodiments, the ACM is configured to determine, at the time of attempting to use the received pre-entitlement data to access protected content, if the received pre-entitlement data was received after previous pre-entitlement data has been loaded into the conditional access module. The ACM is also configured to prevent use of the pre-entitlement data in response to the determination if the determination is affirmative. It will be understood that, in some embodiments, the ACM checks that the expiry time of the entitlement in question has not passed at the same time and, in some embodiments, authenticates the message and/or data. If any of these conditions are not met (i.e. the pre-entitlement is not the first one, the expiry time has passed or the message and/or data did not pass authentication and/or the digital signature failed to be verified), access is prevented. Making these determinations at the time of use advantageously enables the message and/or data to be stored in general memory, for example volatile RAM of the ACM or associated content consumption device, with the security of the entitlement being protected by carrying out the determinations in a secure environment, for example a Trusted Execution Environment TEE or Secure Element SE. In some embodiments, the message and/or data may be stored in a non-volatile memory (for example, flash) and, during processing of the message, transferred from the non-volatile memory to RAM. The latter may be provided by a smartcard or an isolated and protected part of a chipset or other hardware component. It will more generally be understood that some or all of the described functions of the ACM, in particular those functions pertaining to the use of access data to enable access, the authentication of messages and/or data and the verification of any of the conditions for enabling access, such as the verification of the expiry time, may be implemented in secure hardware or software, for example a TEE, SE, dedicated chip or chipset, etc.

In some embodiments, alternatively or additionally, the determination of whether a message and/or data is a first received one or not is carried out at the time of receipt of the message, for example verifying if a pre-entitlement message or data has already been stored. In case this is so, storing of the pre-entitlement message and/or data may be prevented.

As mentioned above, the pre-entitlement data may comprise an identifier specific to the expiry time. Thus, in some embodiments, the ACM is configured to store verification data enabling verification of the identifier in a one-time programmable memory and, prior to using the pre-entitlement data to access media content, determine if the identifier of the pre-entitlement data matches the verification data in order to determine if the message and/or data in question is the one first received or a subsequent one. The ACM is configured to prevent use of the pre-entitlement data to access media content if the identifier of the pre-entitlement data does not match the verification data. By storing the verification data in one-time programmable memory, later overwriting or changing of the verification data is prevented, thereby ensuring that the first received message and/or data is identified. The verification data may simply be the identifier itself, or it may be generated using a function or transformation of the identifier. The function or transformation is such that the ACM can later determine whether the verification data corresponds to the identifier.

Verification of the identifier enables the ACM to reject or prevent use of later messages and/or data having a later expiry time and thus prevent unauthorised extension of the expiry time. However, if the head end (or other ACS source) transmits a pre-entitlement message having the identifier corresponding to the expiry time of a pre-entitlement message first received by the ACM but having a later expiry time, the use of this message would not be prevented on the basis of the identifier check failing. This enables authorised extension of the expiry time by providing a loophole that can be exploited by the source of the message for authorised extension of the expiry time. The verification may be carried out at the time of use, as described above, for example together with the other checks described or at time of storage to prevent use, storage or both of the message and/or data, as described above.

In some embodiments, instead of or in addition to verifying an identifier, at time of use or otherwise, the ACM may be configured to store the pre-entitlement data itself in one-time programmable memory and prevent use of pre-entitlement data not stored in the one-time programmable memory. Since the one-time programmable memory can only be written to once, this enforces use of only the first received pre-entitlement data and is thus an example of preventing use of later received pre-entitlement data without explicit evaluation of a condition. In some embodiments, instead of storing the pre-entitlement data in one-time programmable memory, a digest, for example a hash such as a cryptographically secure hash, of the pre-entitlement data or a portion thereof is stored in one-time programmable memory. The stored digest can then be used to compare against a digest of the received pre-entitlement data to decide whether to prevent use of the received pre-entitlement data or not. In some embodiments, the digest is generated from at least a portion comprising the actual expiry time of the pre-entitlement data, thus closing the loophole for authorised extension of the expiry time.

In some embodiments, the ACM is configured to irreversibly and physically alter the one-time programmable memory when storing data in the one-time programmable memory. For example, the one-time programmable memory could be a Programmable Read Only Memory PROM or an eFuse memory. In other embodiments, the one-time programmable memory is a physically re-programmable non-volatile memory, such as an Electrically Erasable Programmable Read Only Memory EEPROM, flash memory or other solid-state memory, but is configured to be programmable only once by virtue of its physical connection in the ACM or by virtue of software permissions for write access to the memory.

The described embodiments have been defined above in terms of the prevention of use of pre-entitlement messages and/or data received after a first message and/or data. It will be appreciated that if the prohibitory conditions in question are not met such that use is not prevented, it is enabled and the pre-entitlement data is used to access protected media content (subject to any other permissive conditions also being met). Naturally, a person skilled in the art will understand that a prohibitory condition being met is equivalent to a permissive condition not being met and vice versa and the present disclosure will be understood accordingly. Further, the described embodiments have been described in terms of an expiry time. In many embodiments, the expiry time is defined in terms of an expiry date, although the disclosure is not so limited. Consequently, the period of validity achieved by setting the expiry time is in many embodiments a period of days, weeks, months, etc., or a combination thereof. More fine-grained definitions of expiry time and validity period are used in some embodiments, for example in terms of hours or other units of time. The period or duration of validity may be pre-determined and fixed for each update of the expiry time or may vary over updates, as dictated by convenience and the specific application.

In some embodiments, a content consumption device comprises an ACM as described above, a receiver to receive protected content and entitlement messages, a descrambler to descramble the protected content using control data, for example a CW, derived from the access data and a video processor to generate a video signal from the descrambled content. For example, the content consumption device may be a STB or a smart television set. The ACM may be an integral component of the content consumption device or may be connectable to the content consumption device. For example, the ACM may be provided as a dongle or other connectible (for example having a memory stick form factor) that can be connected to a connection port of the content consumption device, for example a serial port such as a Universal Serial Bus USB port, a High-Definition Multimedia Interface HDMI port, etc.

Further aspects relate to a pre-entitlement message as defined above, a system comprising means for implementing one or more methods as described above and a computer program product, for example one or more tangible non-transient computer readable media, comprising coded instructions that implement one or more methods as described above when executed on a computer processor. Yet further aspects relate to one or more methods implemented by the ACM described above, and a computer program product, for example one or more tangible non-transient computer readable media, comprising coded instructions that implement one or more such methods when executed on a computer processor.

Some specific embodiments are now described by way of illustration with reference to the accompanying drawings in which like reference numerals refer to like features.

With reference to FIG. 1A, an access controlled media content delivery system 100 comprises a transmitter 102 having a processing environment and a communications interface. The transmitter 102 broadcasts media content over a transmission medium 104, for example cable, satellite, over the air broadcast or an Internet or other packetized data connection, to a number of content consumption devices 106. A content consumption device 106 may be, for example, a set-top-box without a display, an integrated receiver decoder, an integrated television, an access control dongle, a personal computer, or a mobile device such as a smart phone or tablet. The transmitter 102 may for example be provided by a head end of the access controlled media content delivery system 100. The content consumption devices 106 implement access control functionality. Transmission of the content may instead be multicast, pointcast or on demand in some embodiments and the transmission medium may be a bi-directional data communication network and content may be provided over the top OTT the data communications network. Reference to broadcast and broadcasting below will be understood accordingly in such embodiments.

Transmitter 102 transmits media content and entitlement messages to content consumption devices 106 in the access control system 100. The entitlement messages are transmitted in known fashion, together with or separately from media content, for example in a data carousel. The entitlement messages may be addressed to any content consumption device 106 in the system 100 or may be addressed to a group of devices 106 (for example identified by a range of device or subscriber identifiers) or to individual content consumption devices 106, as is well known.

Subscribers to services provided by transmitter 102, for example paid-for channels, programs or media events, use content consumption devices 106 to access the services they have subscribed to. Specific entitlement messages are broadcast by the transmitter 102 addressed to the subscriber's content consumption device 106 and enable the content consumption device 106 to access the content, typically by descrambling the paid-for content provided in scrambled form. However, when, for example, a new subscriber uses a content consumption device 106 for the first time, it may be desirable to provide the subscriber with immediate access to a default, possibly wide, service offering, to enable access while the subscriber's subscription is processed and possibly to entice the subscriber to subscribe to a wider offering. To that end, specific entitlement messages are broadcast that are either addressed to, and hence accessible by, any content consumption device 106 in the system 100 or, for example, a specific subset that may be defined by a range or list of content consumption devices 106 or subscriber identifiers corresponding to a geographical region or age of the device 106 or the subscription. Such entitlement messages will be referred to as pre-entitlement messages in this disclosure.

With reference to FIG. 1B, a pre-entitlement message 150 includes information relating to a given entitlement to access one or more services in the system 100 that can be loaded or installed by the content consumption device 106. The information is written to an entitlement table. Each pre-entitlement message 150 comprises a header 152 with information that enables each content consumption device 106 to establish whether the message is addressed to it, for example a device or subscriber identifier. Address information is not needed in embodiments in which absence of an address indicates a global message accessible to all devices 106. The header further comprises an indicator indicating that the message 150 is a pre-entitlement message and shall be treated differently by the devices 106 than entitlement messages specifically issued to subscribers, as described below. Specifically, the indicator indicates to the devices 106 that a pre-entitlement message 150 shall be installed and/or used by each device 106 only once, that is a pre-entitlement message received after a first pre-entitlement message has been received shall not be installed and/or used. Each pre-entitlement message 150 also includes an expiry time 154 until which the entitlement is valid, that is until access to services authorised by the entitlement is available. As described below, pre-entitlement messages 150 are transmitted by the transmitter 102 with a rolling expiry time and the limitation to the use of only a first pre-entitlement message 150 guards against unauthorised extension of the expiry time.

In some embodiments, the pre-entitlement message 150 comprises an identifier 156 specific to the expiry time 154, which enables the prohibition against use of later pre-entitlement messages to be prevented. Further, since the identifier 156 can be manipulated by the transmitter 102, this enables the transmitter 102 to update the expiry time 154 of a previously sent pre-entitlement message, as described below. The identifier 156 may replace the indicator in the header 152, i.e. it may be used by the client device 106 to recognise pre-entitlement messages 150 in some embodiments.

The pre-entitlement message 150 may, in some embodiments, provide access to all content that is available from the transmitter 102, or a subset thereof, for example specific channels or content, channels or content requiring a given subscription level or belonging to a certain category. Where the system 100 is shared by several service providers, access may be limited to a specific service provider. Access details are defined in the pre-entitlement message 150 by access data 158 specifying the entitlement, for example in terms of subscription level, content category, one or more specific channels, programs or media events, or a combination of any two or more of these. Access data 158 may comprise further data enabling access to the content in question, for example a decryption key useable to decrypt control words transmitted with the content in question to decrypt the control word and enable descrambling of, and hence access to, the content.

The pre-entitlement message 150 may comprise data, such as digital signature 160 in some embodiments, that can be used at the content consumption device 106 to authenticate the pre-entitlement message 150. Authentication may proceed at the content consumption device 106 by verification of the digital signature 160, for example using a trusted digital certificate or merely a public key associated with the signing entity, for example the entity operating the transmitter 102 or more generally a service provider. Authentication of the pre-entitlement message 150 ensures that the content of the message (specifically its pre-entitlement data), cannot be tampered with undetected at the content consumption device 160, so that the pre-entitlement messages can be stored in general purpose memory without special security measures at the content consumption device 106. Additionally, part of the pre-entitlement message 150, and in particular the access data 158, may be encrypted. In some embodiments, the full pre-entitlement message 150 is encrypted.

Figure 2:
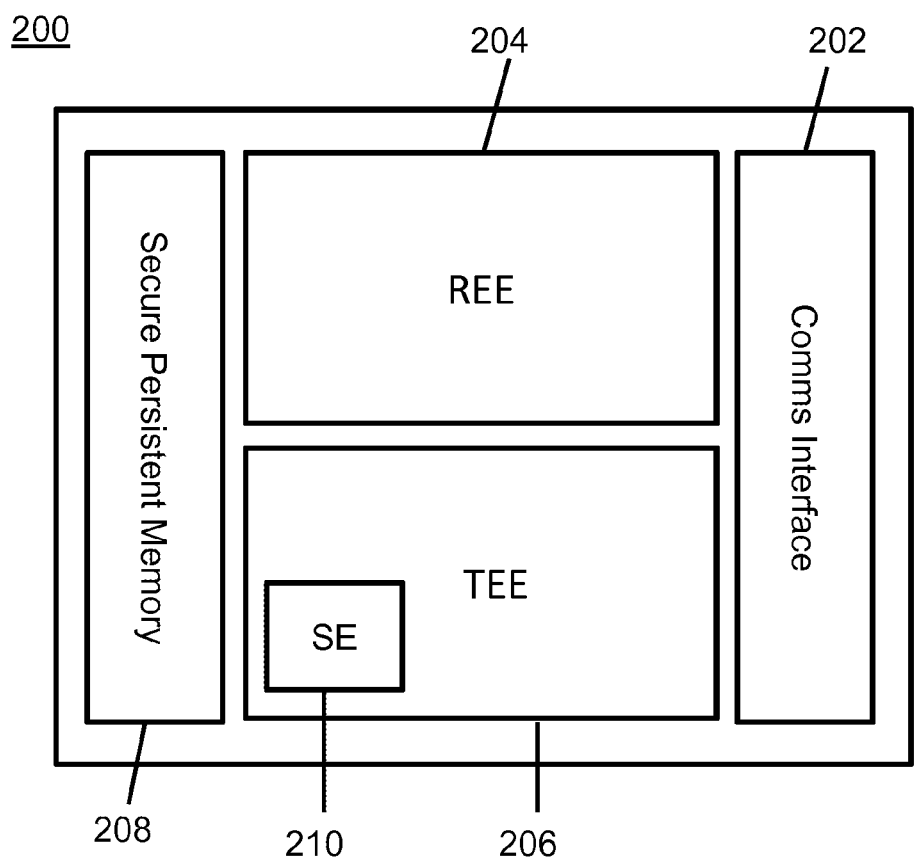
FIG. 2 shows a block diagram of a content consumption device according to an embodiment.

With reference to FIG. 2, an ACM 200 associated with a content consumption device 106 comprises a communications interface 202, typically a broadcast receiver in a broadcast context, a rich execution environment REE 204, a trusted execution environment TEE 206 and a secure persistent memory 208. In some embodiments the ACM may be integrated in the content consumption device 106 and the communications interface 202 is shared between the ACM 200 and the content consumption device 106. It will be understood that the content consumption device 106 comprises many other components necessary for the reproduction of content, such as a descrambler for descrambling scrambled content, a video generator and a display controller. These may be implemented in a combination of software and dedicated hardware. In some embodiments, the ACM 200 is provided as a separate unit externally connectable to the content consumption device 106 via a connection port and the communications interface in these embodiments may provide a port driver, for example a serial port driver for communication between the content consumption device 106 and the ACM 200.

The communications interface 202 is configured to receive a pre-entitlement message such as pre-entitlement message 150 described above, either in terms of a broadcast signal in integrated embodiments or via the connection port after receipt by a receiver in the content consumption device 106, and pass it to the REE 204. The REE 204 comprises the device normal operating system, a network communications adapter, user interface functionality, graphics and video functionality and, according to some embodiments, a portion of a content processing and descrambling module for processing and outputting decrypted content to the user or to a video/display processor for further processing, in conjunction with content access functionality implemented in the TEE 206.

The TEE 206 provides an execution environment that runs alongside and is isolated from the REE 204. The TEE 206 is configured to protect its contents from general software attacks and defines safeguards as to data and functions that a program can access from outside the TEE 206. A TEE is a secure area that ensures that sensitive data is protected by processing the data in a trusted environment and storing it in secure storage. In some embodiments, the TEE 206 has its own dedicated secure storage (for example one-time programmable memory OTP, RAM, or read-only memory ROM). A TEE's ability to offer safe execution of authorized security software, known as 'trusted applications', enables it to provide end-to-end security by enforcing protection, confidentiality, integrity and data access rights.

In some embodiments, the TEE 206 further comprises a secure element SE 210, which implements those functions requiring the highest degree of security. A SE 210 provides enhanced security using software and tamper resistant hardware. It allows high levels of security and can work together with a TEE 206. The SE 210 may include a platform onto which applications can be installed, personalized and managed. It comprises hardware, software, interfaces, and protocols that enable the secure storage of certificates and execution of applications, such as for access rights evaluation. The SE 210 may be implemented in different forms such as a Universal Integrated Circuit Card UICC, or a device linked by Near Field Communication NFC. The SE 210 may be provided as a separate chip or secure device, which can be inserted into a slot of the device 106. The SE 210 can also be provided embedded in the device 106. The SE 210 may include one or more security domains, each of which includes a collection of data that trust a common entity (i.e., are authenticated or managed using a common or global cryptographic key or token).

In some or all of these embodiments, some or all of these functions are implemented in dedicated hardware to further reduce the risk of a successful attack on the access control system. Further, in some embodiments, a portion of the described functionality may be implemented in the TEE 206, in some embodiments in dedicated hardware. Any security critical operations, such as the verification of digital signatures or the evaluation of access conditions, and any operations involving the handling of secret information, such as persistent decryption and/or encryption keys are preferably handled by the SE 210, if present, more preferably in dedicated hardware of a secure chipset. In the absence of an SE 210 or dedicated security chipset, these functions are handled in the TEE 206.

The secure persistent memory 208 is configured as a one-time programmable memory OTP. This may be implemented by way of control of write permissions to a secure Flash memory, for example or by use of a memory that is physically OTP, that is in which the memory is irreversibly physically altered the first time it is written to, so that it subsequently not possible to alter the stored data. An example of such a physically OTP is a PROM. In some embodiments, the OTP is used in enforcing the prohibition against use of subsequent pre-entitlement messages after a first such message is received, as described below.

Figure 3:
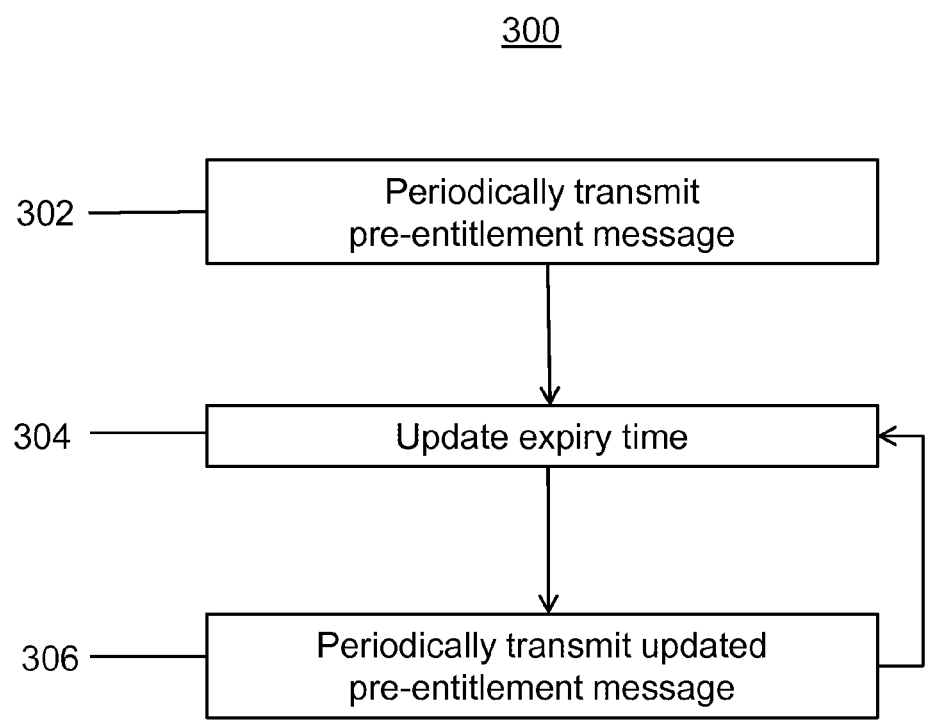
FIG. 3 shows a method of transmitting entitlement messages to content consumption devices according to an embodiment.

FIG. 3 shows a method 300 of transmitting pre-entitlement messages from the transmitter 102 to content consumption devices 106 in the access control system 100. The method 300 may be implemented at a head end of the access control system 100.

At step 302, a pre-entitlement message, such as pre-entitlement message 150, is periodically transmitted, for example in a data carousel. The pre-entitlement message may be transmitted in any suitable format, for example as described above in relation to FIG. 1B or in an EMM format adapted to contain the data described above and compliant with the relevant standard for conditional access systems used by the system 100. The interval of transmission may be as short as a few seconds, for example ten or even only two seconds, or longer, for example one or more minutes or hours. A shorter transmission interval is preferable to give new subscribers access to pre-entitlement content with less latency.

At step 304, the pre-entitlement message 150 is updated by updating the expiry time 154 and, in embodiments in which an identifier 156 is present, the identifier 156 is also updated to reflect the updated expiry time 154. For example, the identifier 156 may be a counter which is incremented by a set value each time the pre-entitlement message is updated, providing an identifier 156 specific to the expiry time 154 of the pre-entitlement message 150.

The updated pre-entitlement message 150 is then again periodically transmitted at step 306, as described above. Steps 304 and 306 are repeated periodically, preferably extending the expiry time 154 on each iteration by an amount that corresponds to an interval between successive steps 304, thereby maintaining a sliding window of validity for the pre-entitlement message 150, which is of fixed duration. The expiry time 154 may, for example be changed on a daily, weekly or monthly basis, by a corresponding amount. For example, the expiry time 154 may be extended by a day every day, by a week every week, and so on. In other embodiments, the expiry time 154 is extended by a period different from that at which the pre-entitlement messages are changed. It will, of course, be understood that the duration of validity may be changed over iterations in some embodiments, extending, curtailing or randomly varying the duration as desired.

The transmitted pre-entitlement messages 150 are received and processed at a content consumption device 106 as will now be described.

Figure 4:
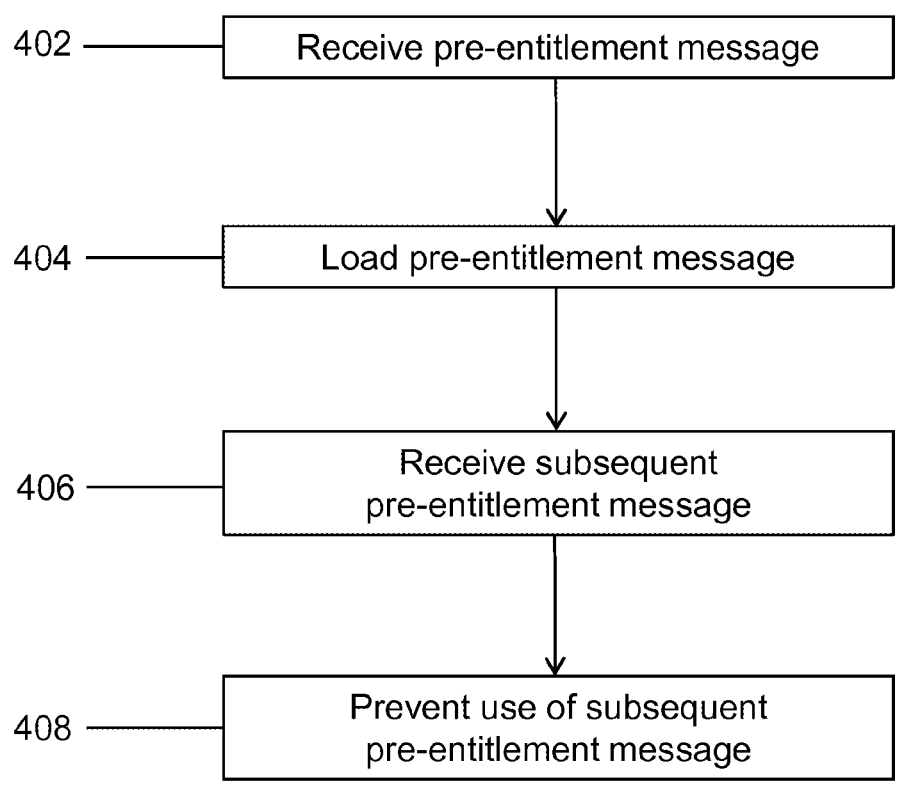
FIG. 4 shows a first method of storing received entitlement information.

With reference to FIG. 4, a method 400 of processing received pre-entitlement information comprises a step 402 at which a first pre-entitlement message, such as pre-entitlement message 150, is received by the content consumption device 106 before any subsequent pre-entitlement messages have been received. The first pre-entitlement message is loaded or installed by the ACM 200 associated with the content consumption device 106, at step 404. The first pre-entitlement message is loaded or installed by storing data of the pre-entitlement message, for example in a table or database containing entitlement data defining the entitlements for the content consumption device 106 to access protected media content. The pre-entitlement message is recognised by the ACM 200 as a pre-entitlement message, for example using the indicator in the header 152 or the identifier 156 and is processed accordingly. For example, the REE 204 receives the pre-entitlement message via the communications interface 202 and sends the received pre-entitlement message to the TEE 206 and/or SE 210 for processing. In some embodiments, the REE 204 sends the received pre-entitlement message to the TEE 206 and/or SE 210 without performing any decryption, so that it merely passes on the pre-entitlement message to the TEE 206 and/or SE 210, like any other entitlement message. In some embodiments, instead of writing the pre-entitlement data to the entitlement database, for example stored in non-volatile memory, the pre-entitlement data may instead be written to the secure persistent memory 208.

At step 406, a further entitlement message is received. The further entitlement message may be substantially the same in content as the entitlement message received at step 402, if received shortly after step 402, or may have an updated, later expiry time 154. At step 408, use of the further entitlement message is prevented. This may be achieved in a number of ways in accordance with respective disclosed embodiments.

In a first group of embodiments, the ACM 200 is configured to require a pre-entitlement message to be written and accessed in the secure persistent memory 208. The first pre-entitlement message is written to the secure persistent memory 208 at step 404, preventing further loading and using of subsequent pre-entitlement messages without any need for evaluation of specific prohibitory conditions indicating that a pre-entitlement message is a subsequently received one. While it is not necessary to prevent use of all subsequent pre-entitlement messages to enforce the original expiry time, but only those having a later expiry time, the latter condition is of course met in these embodiments, which prevent use of any subsequent entitlement messages, including those that have a later expiry time.

In a second group of embodiments, the ACM 200 is configured to store verification data identifying the first pre-entitlement message or its data, often referred to as a fingerprint. Where applicable, the fingerprint may be the digital signature 160. In other embodiments, the fingerprint may be a digest of the first pre-entitlement message or data, for example a cryptographic hash of the first pre-entitlement message, generated at the ACM 200. In some embodiments, the fingerprint may be the identifier 156, where present, enabling manipulation of the fingerprint at the transmitter 102 independently of other data of the pre-entitlement message, for example the expiry time 154. As explained below, this provides the transmitter with additional flexibility. In any of these embodiments of the second group of embodiments, the pre-entitlement message itself can be stored in general purpose random access memory, for example the RAM of the content consumption device 106 or the ACM 200, which is more cost effective than storage in the secure persistent memory 208, in particular if a physical OTP such as PROM or eFuse memory is used. In some embodiments, the pre-entitlement message is stored in a non-volatile memory (flash) and, at the boot time of the consumption device 106, transferred into the RAM or simply used from the non-volatile memory. On the other hand, an additional verification condition has to be evaluated in these embodiments, as will now be described.

Figure 5:
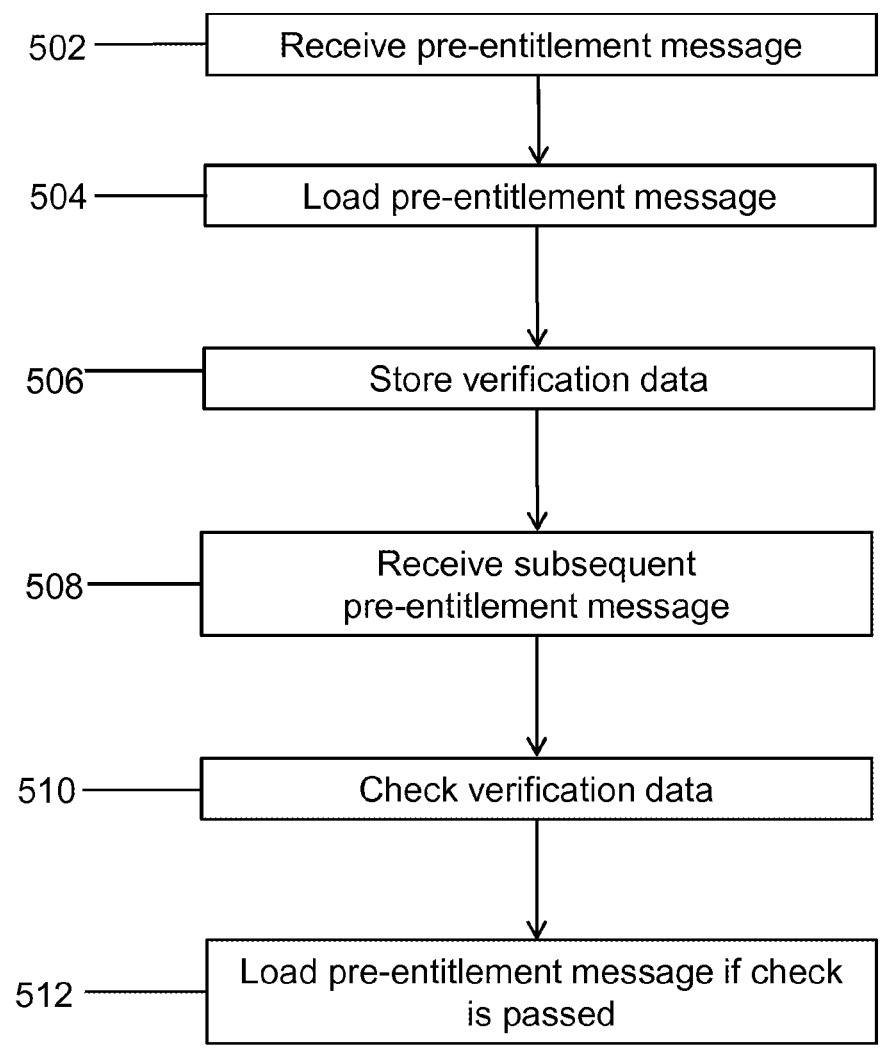
FIG. 5 shows a second method of storing received entitlement information.

With reference to FIG. 5 a method 500 of storing a received pre-entitlement message comprises a step 502, at which a first pre-entitlement message is received. The method may be implemented in a content consumption device 106 and/or an ACM 200. In some embodiments, the pre-entitlement is received only once by a particular device and the device stores it in a non-volatile memory. At step 504 the received entitlement message is loaded as described above, for example the entitlement data is written to an entitlement database, which may be stored in general purpose RAM or non-volatile memory of the content consumption device 106 or the ACM 200.

At step 506 verification data is written to the secure persistent memory 208. In corresponding embodiments, the verification data is of one or more of the following form:
- a flag indicating that a pre-entitlement message has been loaded by the device;
- a digest of the pre-entitlement message generated or received at the content consumption device 106 or the ACM 200, for example a cryptographic hash of the pre-entitlement message or data, or a digital signature 160 of the pre-entitlement message or pre-entitlement data received with the message, received with the pre-entitlement message; and
- the identifier 156.

In the latter two cases, it will be understood that the verification data may be the digest, the identifier 156 or digital signature 160 itself, or data derived therefrom by a verification function.

At step 508, a subsequent entitlement message is received. The subsequent entitlement message may be the same in content as the entitlement message received at step 502 if the subsequent entitlement message is transmitted before an update of the transmitted entitlement messages, specifically the expiry time 154, occurs. If an update occurred since receipt of the first pre-entitlement message, the expiry time 154 of the subsequent message will be different. In some embodiments, the update may alternatively or additionally update the services to which the entitlement relates (for example if a new channel is added).

At step 510, the verification data is checked. In some embodiments, this may comprise checking for the presence of verification data, and hence prior receipt of a pre-entitlement message. Consequentially, in these embodiments, no subsequently received pre-entitlement message will be loaded. In other embodiments, the verification data is used to verify the subsequently received pre-entitlement message and, if the verification is passed, the subsequently received pre-entitlement message is loaded. Specifically, the verification data is compared with corresponding data derived from or received with the subsequent pre-entitlement message, that is one or more of:
- a digest of the pre-entitlement message generated or received at the content consumption device 106 or the ACM 200, for example a cryptographic hash of the pre-entitlement message or data, or a received digital signature 160 of the pre-entitlement message or pre-entitlement data, received with the pre-entitlement message; and
- the identifier 156.

To check for a match with the verification data, the digest, identifier 156 or digital signature 160 are directly compared to the verification data or passed through the verification function for comparison against the verification data. If the check is passed (the two sets of verification data match), the subsequent entitlement data is loaded by the content consumption device 106 or the ACM 200 at step 512 and may overwrite the previously loaded pre-entitlement message or data or restore the pre-entitlement data, for example on boot-up if stored in volatile memory.

Whether the verification data is specific to all of the pre-entitlement message and/or data (in the case of a digest or digital signature 160), or specific to the expiry time 154 (in the case of the identifier 156), the ability to load subsequent pre-entitlement messages that match a previously loaded pre-entitlement message enables reloading of previously received pre-entitlement messages. This enables the pre-entitlement to be restored, for example on boot-up in case of the entitlement database of the content consumption device 106 or the ACM 200 being stored in volatile memory, or to refresh the database. To that end, in some embodiments, the transmitter 102 periodically re-sends all entitlement messages, for example until their respective expiry times.

In the case of the verification data corresponding to a digest or digital signature 160, the verification of the subsequent pre-entitlement message amounts to verifying that the previously loaded and subsequently received entitlement messages are identical in the data used for the digest and/or digital signature 160. In the case of the verification data corresponding to the identifier 156, modification of a previously transmitted and loaded pre-entitlement message by the transmitter is possible, while preventing or reducing the risk of unauthorised extension of the expiry time 154, in particular in embodiments where the pre-entitlement message is authenticated by the ACM 200, for example using a digital signature 160, as described above. Specifically, if the transmitter 102 wishes to modify a previously transmitted pre-entitlement message, for example to extend the expiry time 154 or add services that can be accessed, for example additional channels, programs or other media events, the transmitter transmits a pre-entitlement message that is modified accordingly but with the identifier 156 of the previously transmitted pre-entitlement message that is to be replaced with, for example, an extended expiry time or added services. When such an updated pre-entitlement message is received, it will pass verification against the stored verification data of the previously received pre-entitlement and be loaded as it was the first received pre-entitlement message.

Figure 6:
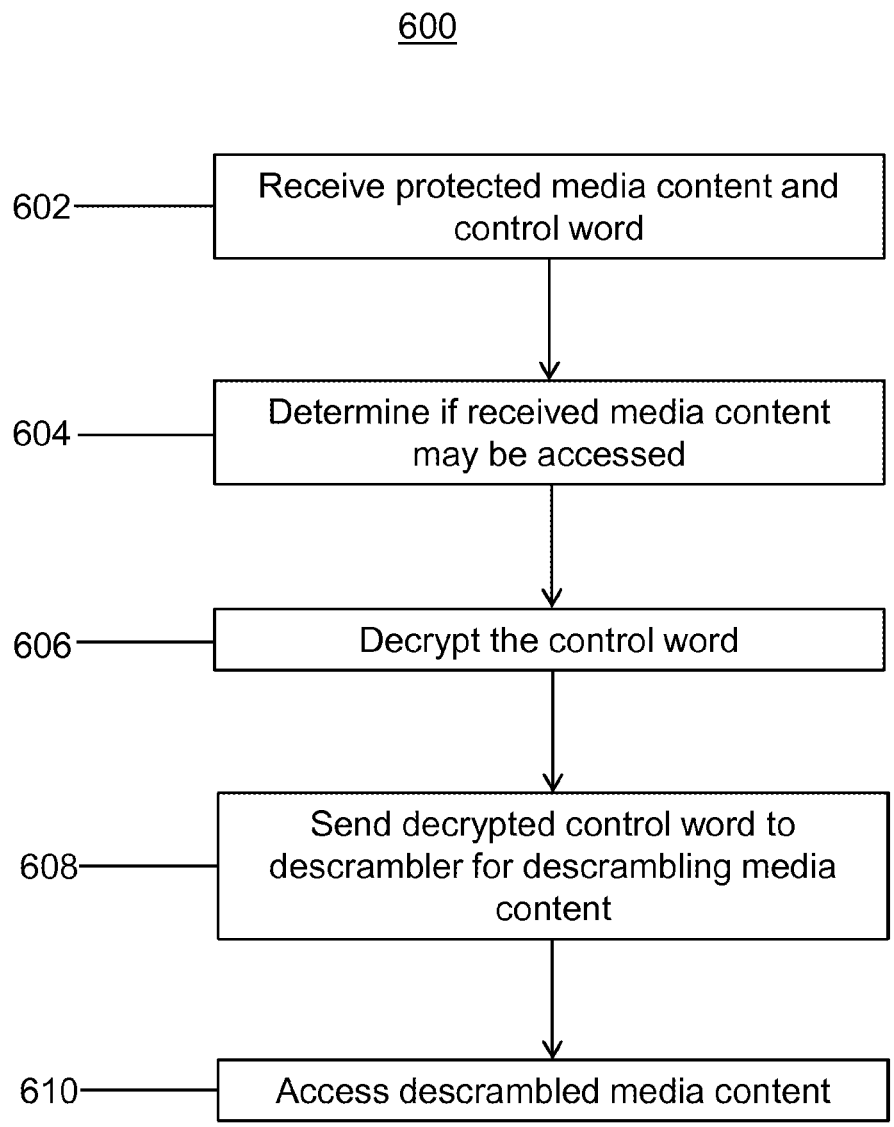
FIG. 6 shows a method of using a stored entitlement to access protected media content.

With reference to FIG. 6, a method 600 of using a loaded entitlement to access protected media content comprises a step 602, at which protected media content is received at, for example, the content consumption device 106 and/or the ACM 200. The protected media content may be transmitted, for example broadcast in accordance with a broadcast schedule, from the transmitter 102 as a scrambled media stream. In other embodiments, the protected media content is received on demand. The protected media content may be transmitted together with an ECM or other data structures comprising the access information needed to access (descramble) the scrambled content, for example a descrambling key, often referred to as a control word. In some embodiments, the access information further comprises the current time (to avoid relying on a device clock at the content consumption device 106 or the ACM 200). In some embodiments, the information comprises the entitlement(s) that give access to the protected content, for example one or more of the required subscription level, a channel ID or a class or category of the content, although the information to determine entitlement may be received in different form for example in the form of a Program ID associated with the received content, a channel identifier, a channel frequency, etc.

At step 604, a determination is made as to whether the received protected media content may be accessed. The determination comprises the following checks:
- Is there an entitlement loaded in the content consumption device 106 and/or the ACM 200 that authorises access to the protected content, for example in an entitlement database in the device and/or module, for example stored in general purpose RAM?
- Optionally, are any of the applicable entitlements still valid? For example, the expiry time of the entitlement may be compared with the current time in the access information (or a device clock in some embodiments). For example, in the case of an expiry time, step 604 may check if the expiry time is at or before the current time. Alternatively, the content consumption device 106 and/or the ACM 200 may manage entitlements by deleting all expired entitlements on expiry.

If the entitlement to be used is a pre-entitlement, is it the first pre-entitlement loaded in the content consumption device 106 and/or the ACM 200? This check may involve comparing part or all of the entitlement data with the verification data in the secure persistent memory 208 and checking for a match as described above.

Optionally, authenticate the entitlement to be used, for example using a digital signature 160, as described above.

It will be appreciated that those checks that are carried out at step 604 collectively determine whether access to the protected content should be allowed or not, so that the order in which these checks are implemented, subject to internal consistency, is not of central importance and may vary from one embodiment to the next. For example, while it is likely more efficient to first determine an applicable entitlement before carrying out any remaining checks on the entitlement, the check could be carried out in any order on all loaded entitlements and the surviving entitlements considered at any step or after collective evaluation of all checks. Likewise, the implementation of the checks is not central to this disclosure and many possible solutions will occur to the person skilled in the art, for example accessing a database of loaded entitlement using a data base query on the access criteria (e.g. subscription level and/or category and expiry time) and evaluating any remaining conditions on the returned records in the database.

It will further be appreciated that in embodiments where both steps 510 (checking verification data on storage of a pre-entitlement message) and 604 (checking verification data on use of stored a pre-entitlement message) are implemented, step 604 will be redundant in case that there is no attempt at fraud, since only the first received pre-entitlement message (subject to the possibility of limited re-loading described above) will be loaded in the content consumption device 106 or the ACM 200. However, in a case of attempted fraud by manipulating the content of, for example, an entitlement database by circumventing step 604 and fraudulently writing a later pre-entitlement message in the database (which may be an authentic pre-entitlement message, thus passing any authentication check), step 510 will catch such an attempt at fraud at the time of using the pre-entitlement and may take appropriate action, such as one or more of blocking access, blocking the device, storing forensic data and transmitting an alert (if a return connection is available). Thus, the combination of preventing loading of a subsequently received pre-entitlement message (such as at step 510) with preventing use of the subsequently received pre-entitlement message at the time of use (such as at step 604) provides embodiments with enhanced security. However, some embodiments either carry out checks to prevent loading of a subsequently received pre-entitlement message (such as at step 510) or preventing use of a subsequently received pre-entitlement message (such as at step 604)

If it is determined that the received protected media content may be accessed (for example a pre-entitlement granting access has been found, has been authenticated, is the first received pre-entitlement—its identifier is the same as that stored in persistent memory—and has not expired), the method proceeds to step 606 to provide access to the protected content. If it is determined that the received protected media content may not be accessed, the method stops without enabling access. Additionally, forensic data may be generated, the device may be permanently disabled, an alarm may be raised, etc.

At step 606, enabling access may in some embodiments comprise decrypting an encrypted CW or other descrambling key and providing the decrypted CW to a descrambler in the content consumption device to enable the descramble to descramble the content. The use of encrypted CW to control access is well known in the field of CAS and will readily be implemented by a person skilled in the art in the disclosed embodiments. In embodiments based on scrambling and/or descrambling the protected content, the decrypted CW or other descrambling key is provided to a descrambler for descrambling the protected media content and the scrambled media content is descrambled at step 608. At step 610, the descrambled protected media content is output, for example after further processing by a video processor to decode the video stream and a display controller to cause a display to display the content, or to output the content via a media output for display on a separate display device.

Figure 7:
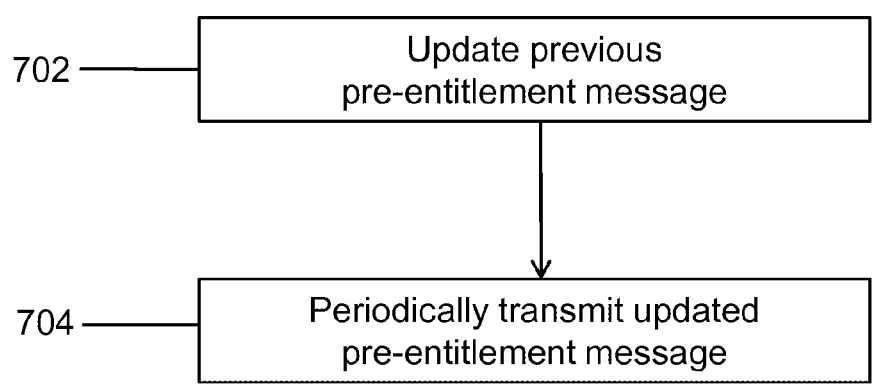
FIG. 7 shows a method of transmitting adjusted entitlement messages to content consumption devices according to an embodiment.

Returning to the transmission and update of pre-entitlement messages, FIG. 7 shows a method 700 of transmitting a pre-entitlement message from the transmitter 102 to content consumption devices 106 in the access control system 100 in order to update a previously sent pre-entitlement message at a content consumption device 106. The method 700 may be implemented, for example, at a head end of the access control system 100.

At step 702, the previously sent pre-entitlement message is updated. This update may include an extension (or curtailing) of the expiry time 154 of the previously sent pre-entitlement message, or an addition (or removal) of services that can be accessed, for example channels, programs or other media events. At step 704, the updated pre-entitlement message is periodically transmitted. In this way, content consumption devices 106 that legitimately receive and load the updated pre-entitlement message are enabled to access content according to the most up-to-date conditions in spite of having previously received and loaded the previously sent pre-entitlement message, as described above.

Figure 8:
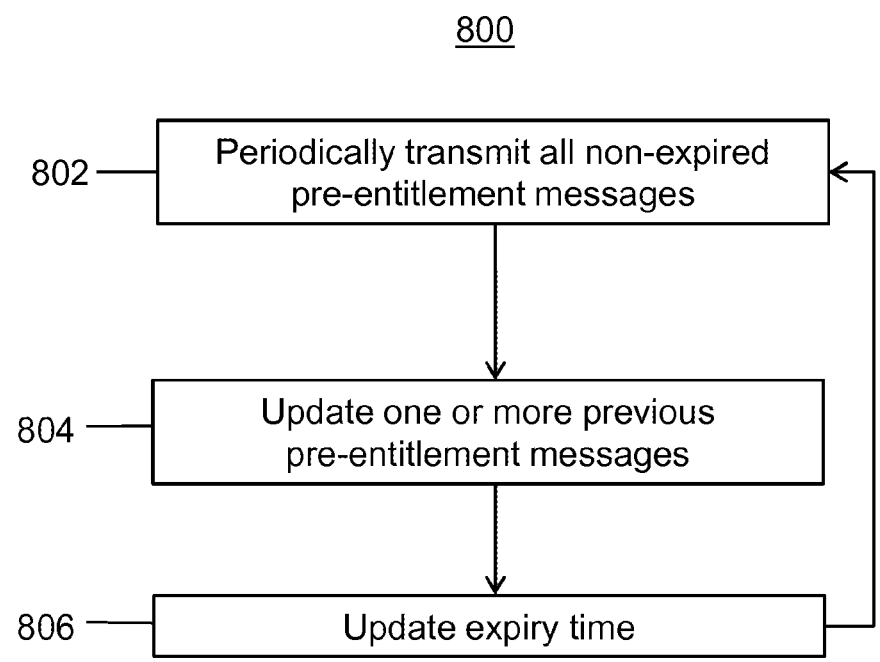
FIG. 8 shows a further method of transmitting adjusted entitlement messages to content consumption devices according to an embodiment.

FIG. 8 shows the method 700 integrated with the method 300, in the form of method 800. At step 802, all pre-entitlement messages that have not yet expired, that is those messages with an expiry time in the future, are transmitted, including those messages that are as originally sent and those that may have been updated. At step 804, one or more of the previous pre-entitlement messages are updated. This update may include an addition (or removal) of services that can be accessed, for example additional channels, programs or other media events. At step 806, a new pre-entitlement message is generated with an updated expiry time, as described above at step 304. The new message and all previously sent non-expired pre-entitlement messages are periodically sent, for example added to a data carousel at step 802.

While a number of methods have been described above with reference to flow diagrams in FIGS. 3, 7 and 8, it will be appreciated that the various method steps can be re-ordered, or one or more steps omitted, for example steps 804 or 806, as suitable for any specific embodiment or application at hand.

Figure 9:
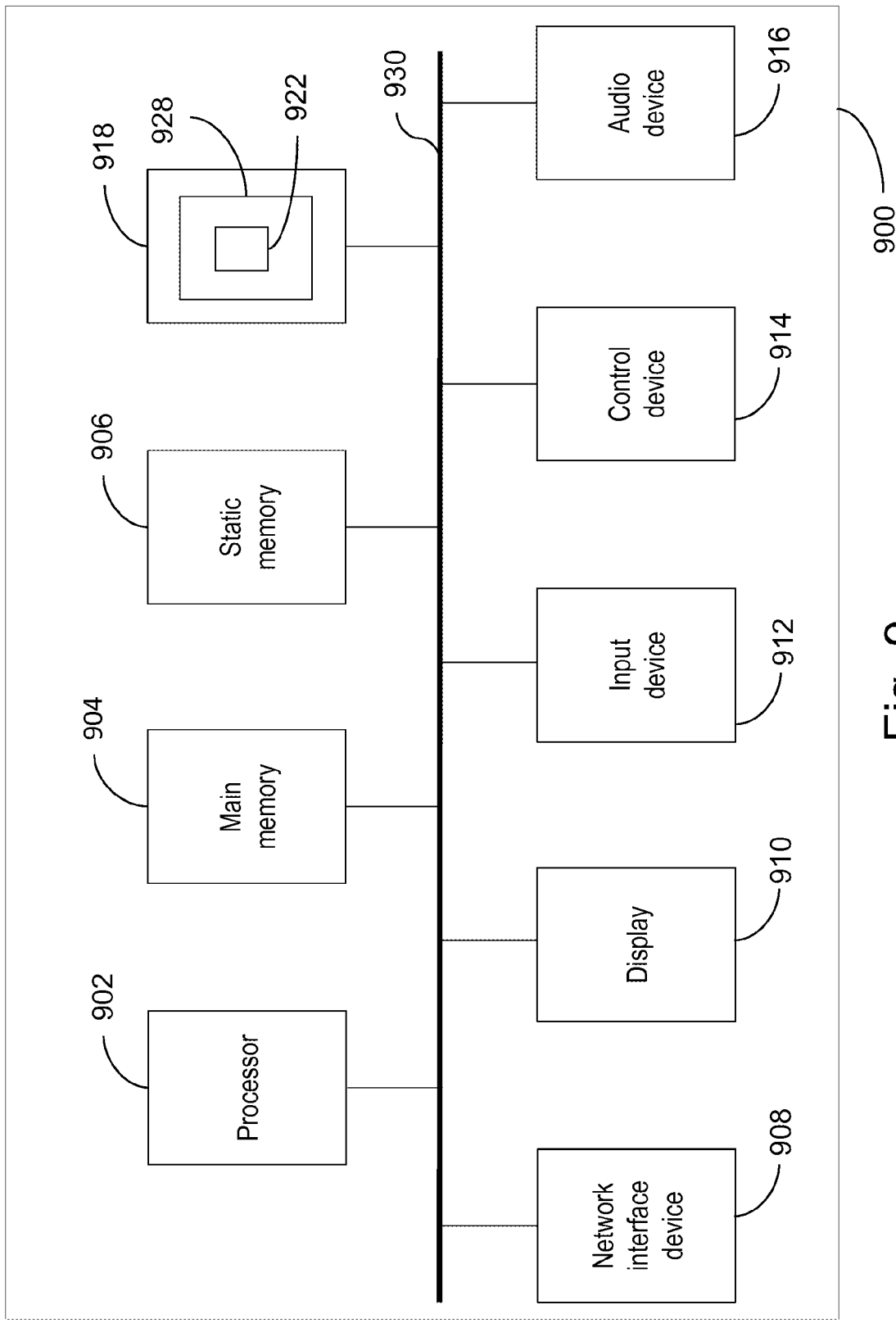
FIG. 9 shows a block diagram of one implementation of a computing device.

FIG. 9 illustrates a block diagram of one implementation of a computing device 900 within which a set of instructions, for causing the computing device to perform any one or more of the methodologies discussed herein, for example in FIG. 3, 7 or 8, may be executed. In alternative implementations, the computing device may be connected (e.g., networked) to other machines in a Local Area Network LAN, an intranet, an extranet, or the Internet. The computing device may operate in the capacity of a server or a client machine in a client-server network environment, or as a peer machine in a peer-to-peer (or distributed) network environment. The computing device may be a personal computer PC, a tablet computer, a set-top box STB, a Personal Digital Assistant PDA, a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 900 includes a processing device 902, a main memory 904 (e.g., read-only memory ROM, flash memory, dynamic random access memory DRAM such as synchronous DRAM SDRAM or Rambus DRAM RDRAM, etc.), a static memory 906 (e.g., flash memory, static random access memory SRAM, etc.), and a secondary memory (e.g., a data storage device 918), which communicate with each other via a bus 930.

Processing device 902 represents one or more general-purpose processors such as a microprocessor, central processing unit, or the like. More particularly, the processing device 902 may be a complex instruction set computing CISC microprocessor, reduced instruction set computing RISC microprocessor, very long instruction word VLIW microprocessor, processor implementing other instruction sets, or processors implementing a combination of instruction sets. Processing device 902 may also be one or more special-purpose processing devices such as an application specific integrated circuit ASIC, a field programmable gate array FPGA, a digital signal processor DSP, network processor, or the like. Processing device 902 is configured to execute the processing logic (instructions 922) for performing the operations and steps discussed herein.

The computing device 900 may further include a network interface device 908. The computing device 900 also may include a video display unit 910 (e.g., a liquid crystal display LCD or a cathode ray tube CRT), an alphanumeric input device 912 (e.g., a keyboard or touchscreen), a cursor control device 914 (e.g., a mouse or touchscreen), and an audio device 916 (e.g., a speaker).

The data storage device 918 may include one or more machine-readable storage media (or more specifically one or more non-transitory computer-readable storage media) 928 on which is stored one or more sets of instructions 922 embodying any one or more of the methodologies or functions described herein. The instructions 922 may also reside, completely or at least partially, within the main memory 904 and/or within the processing device 902 during execution thereof by the computer system 900, the main memory 904 and the processing device 902 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory RAM, a read-only memory ROM, a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array FPGA or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "comparing", "enabling", "maintaining," "identifying", "transmitting", "updating", "preventing", "loading", "installing" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

For example, the protected media content may be transmitted on demand. In this way, the protected content is only ever sent as and when necessary, saving bandwidth of transmission. Broadcasting the messages may be in an MPEG 2 stream. Broadcasting the messages may be in a data carousel. This allows periodic transmission of entitlement messages. The transmitting period may be every 10 seconds, one minute, or one hour. The period can be set dependent on the desired level of security. The messages may comprise EMMs. The messages may provide access to all content in the access control system.

If the access data is encrypted, the ACM may be configured to decrypt it. The ACM may be configured to use access data to decrypt a control word received with the protected content and/or to authorise the decryption of the control word and provide the decrypted control word to a descrambler for descrambling protected content. For example, the ACM may decrypt the control word based on a key ladder mechanism. The ACM may be configured to authenticate the message. The ACM may be configured to check a digital signature of the message. Each of these features provides additional security to the process of accessing content. The OTP may be implemented in hardware. The OTP may be implemented in software. The ACM may be configured to store messages in RAM.

The invention claimed is:

1. An access control module comprising:
   circuitry configured to:
   receive a first entitlement message, which is a security message transmitted periodically, wherein the first entitlement message comprises entitlement data comprising an expiry time, access data enabling access to protected media content until the expiry time and an indicator data,
   determine whether an entitlement message is a first received entitlement message by verifying if entitlement data has already been stored, and in response to a positive determination store entitlement data and the indicator data of the first entitlement message into a memory,
   receive access information comprising a current time and a descrambling key,
   compare the current time with the expiry time and decrypt the descrambling key with a decryption key of the access data, and grant access to the protected content in response of a positive comparison,
   receive a subsequent entitlement message,
   update the expiry time stored in the memory with the expiry time included in the subsequent entitlement messages if the subsequent entitlement message indicator data of the subsequent entitlement message is at least the same of the stored indicator data, and
   reject the subsequent entitlement message otherwise.

2. The access control module according to claim 1, wherein the entitlement data includes an identifier specific to the expiry time.

3. The access control module according to claim 2, wherein the circuitry is further configured to:
   store verification data enabling data enabling verification of the identifier in a one-time programmable memory;
   prior to using entitlement data to access media content, determine if the identifier of the entitlement data matches the verification data; and
   prevent use of the entitlement data to access media content if the identifier of the entitlement data does not match the verification data.

4. The access control module according to claim 3, wherein the circuitry is further configured to:
   irreversibly physically alter the one-time programmable memory when storing data in the one-time programmable memory.

5. A content consumption device comprising:
   the access control module according to claim 3;
   a receiver to receive protected content and entitlement messages;
   a descrambler to descramble the protected content using control data derived from the access data; and
   a video processor to generate a video signal from the descrambled content.

6. The access control module according to claim 1, wherein the circuitry is further configured to store the entitlement data in volatile memory.

7. The access control module according to claim 1, wherein the circuitry is further configured to:
   store the entitlement data in a one-time programmable memory; and
   prevent use of entitlement data comprising indicator data not stored in the one-time programmable memory.

8. The access control module according to claim 1, wherein the circuitry is configured to:
   determine, at the time of receiving the entitlement data, if the received entitlement data was received after previous entitlement data comprising indicator data has been stored in the access control module; and
   prevent storing of or to delete the entitlement data in response to the determination if the determination is affirmative.

9. An access control method, comprising:
   receiving, by circuitry, a first entitlement message, which is a security message transmitted periodically, wherein the first entitlement message comprises entitlement data comprising an expiry time, access data enabling access to protected media content until the expiry time and an indicator data;
   determining, by the circuitry, whether an entitlement message is a first received entitlement message by verifying if entitlement data has already been stored, and in response to a positive determination storing, by the circuitry, entitlement data and the indicator data of the first entitlement message into a memory;
   receiving, by the circuitry, access information comprising a current time and a descrambling key;
   comparing, by the circuitry, the current time with the expiry time and decrypt the descrambling key with a decryption key of the access data, and grant access to the protected content in response of a positive comparison;

receiving, by the circuitry, a subsequent entitlement message;

updating, by the circuitry, the expiry time stored in the memory with the expiry time included in the subsequent entitlement messages if the subsequent entitlement message indicator data of the subsequent entitlement message is at least the same of the stored indicator data; and rejecting, by the circuitry, the subsequent entitlement message otherwise.

10. The access control method according to claim 9, wherein the entitlement data includes an identifier specific to the expiry time.

11. The access control method according to claim 10, further comprising:

storing verification data enabling data enabling verification of the identifier in a one-time programmable memory;

prior to using entitlement data to access media content, determining if the identifier of the entitlement data matches the verification data; and preventing use of the entitlement data to access media content if the identifier of the entitlement data does not match the verification data.

12. The access control method according to claim 11, further comprising:

irreversibly physically altering the one-time programmable memory when storing data in the one-time programmable memory.

13. The access control method according to claim 9, further comprising storing the entitlement data in volatile memory.

14. The access control method according to claim 9, further comprising:

storing the entitlement data in a one-time programmable memory; and preventing use of entitlement data comprising indicator data not stored in the one-time programmable memory.

15. The access control method according to claim 9, further comprising:

determining, at the time of receiving the entitlement data, if the received entitlement data was received after previous entitlement data comprising indicator data has been stored in the access control module; and preventing storing of or to delete the entitlement data in response to the determination if the determination is affirmative.

* * * * *